Patented Dec. 26, 1944

2,365,717

UNITED STATES PATENT OFFICE 2,365,717

MONOHYDRIC ALIPHATIC NITROALCOHOL ESTERS OF UNSATURATED DICARBOXYLIC ACIDS

Charles Joseph Mighton, Wilmington, Del., assignor to E. I. du Pont de Nemours & Company, Wilmington, Del., a corporation of Delaware No Drawing. Application August 26, 1941, Serial No. 408,404

6 Claims. (Cl. 260—78)

This invention relates to esters and more particularly to esters of alpha-unsaturated alpha, beta-dicarboxylic acids with monohydric aliphatic nitro alcohols and to polymerization products thereof.

This invention has as an object the provision of a new class of monomeric esters. A further object is the provision of new polymeric materials. Another object is the preparation of new rubber-like polymers and particularly synthetic rubbers of high resistance to swelling in oils. Other objects will appear hereinafter.

These objects are accomplished by the following invention of monohydric aliphatic nitro alcohol esters of alpha-unsaturated alpha,beta-dicarboxylic acids and polymers and interpolymers thereof.

The monomeric esters of this invention may be prepared conveniently by heating the monohydric aliphatic nitro alcohol with the alpha-unsaturated alpha,beta-dicarboxylic acid or an ester-forming derivative thereof, e. g., its anhydride. preferably in the presence of an esterification catalyst such as sulfuric acid or p-toluenesulfonic acid and in the presence of an inert liquid medium. When a liquid medium, e. g., an aromatic hydrocarbon such as benzene or toluene, is employed, it is preferable to heat the mixture in an apparatus whereby the water liberated during the reaction is removed continuously with a portion of the aromatic hydrocarbon. Upon separation of the aromatic hydrocarbon from the water of the binary distillate, the former is returned to the reaction mixture. The continuous removal of water in this manner provides not only for more complete reaction of the alcohol and acid but also provides for following the course of the esterification reaction. The use of an excess of the nitroalcohol is advantageous to promote more rapid and complete reaction of the acid, the excess alcohol being recovered later during purification of the ester. Upon completion of the reaction, the major portion of the inert solvent is preferably removed by distillation and the reaction mixture is then cooled and shaken with a dilute alkali solution and finally with warm water, to extract unreacted alcohol and acid. During the latter operation, a portion of the ester often separates in crystalline form. This is filtered off and the remaining ester is recovered by evaporation of the residual inert solvent. Since many of the nitroalkyl esters are solid, purification may be effected simply by recrystallization from a solvent such as ethyl alcohol.

The polymers of the nitroalkyl esters of alpha-unsaturated alpha,beta-dicarboxylic acids, and particularly polymers obtained by polymerizing these with other polymerizable materials, may be prepared by polymerization methods commonly employed in the art such as by heating in the presence of organic or inorganic peroxide catalysts. Although the polymerization may be conducted in bulk or in solution, it is preferable for most purposes to carry out the polymerization in emulsion. With polymerizable vinyl and vinylidene compounds such as acrylonitrile, styrene, methacrylic esters and the like, hard, glass-like resinous materials may be obtained. With conjugated dienes such as butadiene, isoprene, or chloroprene which belong to a special type of vinyl compounds, valuable synthetic rubbers are obtained.

Valuable rubber-like materials may be prepared by polymerization of chloroprene alone or by interpolymerization of chloroprene or butadiene-1,3 with other polymerizable materials such as acrylic or methacrylic acid derivatives, vinyl ketones, simple alkyl maleic or fumaric esters, and the like. Many of these synthetic rubbers are greatly superior to natural rubber in their resistance to swelling in organic solvents, especially in aliphatic hydrocarbons, and their industrial application in many instances is dependent to a large extent upon this particular advantage. However, for certain applications there is a need for rubbers of even greater solvent resistance than those hitherto known. It has now been found that by interpolymerization of nitroalkyl esters of alpha-unsaturated alpha,beta-dicarboxylic acids with butadienes, and particularly with chloroprene, rubber-like materials may be obtained which, upon compounding and curing, give vulcanizates possessing excellent stress-strain properties, and, in addition, outstanding solvent resistance. Interpolymers with chloroprene, when compounded with ingredients commonly employed with polychloroprene (neoprene) exhibit unusually rapid curing properties. Accordingly, to obtain rubber-like vulcanizates possessing good tensile strengths and satisfactory moduli, a short cure at a relatively low temperature is usually sufficient. On increasing the period or temperature of cure, the vulcanizates become progressively harder and less elastic, and finally tough, ebonite-like materials are obtained. This effect of increased temperature or period of cure upon the properties of the vulcanizates is especially surprising since similar treatment of corresponding stocks of polychloroprene or interpolymers of chloroprene usually results only in elastic rubber-like vulcanizates possessing higher moduli and slightly lower tensile strengths.

The more detailed practice of the invention is illustrated by the following examples, wherein parts given are by weight. There are of course many forms of the invention other than these specific embodiments.

EXAMPLE I

Di-2-methyl-2-nitropropyl fumarate

A mixture of 58 parts of fumaric acid, 177 parts of 2-methyl-2-nitro-1-propanol, 200 parts of toluene and five parts of p-toluene sulfonic acid is refluxed for approximately eight hours during which time water and toluene distill as a binary which separates from the mixture. The toluene which separates from the binary mixture is returned continuously to the reaction flask and the water, 13 parts, is drawn off at intervals from the distillate receiver. When no further water distills, the reaction mixture is poured into water and neutralized with sodium carbonate. The crystalline di-2-methyl-2-nitropropyl fumarate is filtered off and the toluene layer is evaporated to dryness. After recrystallizing from a mixture of ethyl alcohol and benzene (1:4), 85 parts of light-colored crystalline ester are obtained. After recrystallizing further from benzene alone, 78 parts of colorless di-2-methyl-2-nitropropyl fumarate melting sharply at 129.5° C. is obtained.

EXAMPLE II

Di-2-nitrobutyl fumarate

A mixture of 58 parts of fumaric acid, 208 parts of 2-nitro-1-butanol, 210 parts of dry benzene, one part of concentrated sulfuric acid and three parts of p-toluene sulfonic acid is heated at reflux as in Example I above for approximately 12 hours. An additional 59 parts of the alcohol is then added and refluxing is continued until no further water distills as a water-benzene binary mixture. After treating the reaction mixture with water and sodium carbonate, the residual benzene is evaporated and the product is recrystallized from ethyl alcohol. One hundred nine parts of di-2-nitrobutyl fumarate is obtained as colorless, lustrous crystals melting at 50–51° C. Analyses give the following results: C—45.11%; H—5.71%. The theoretical carbon and hydrogen values for di-2-nitrobutyl fumarate are C—45.28%; H—5.66%.

EXAMPLE III

Di-2-methyl-2-nitropropyl maleate

A mixture of 98 parts of maleic anhydride, 298 parts of 2-methyl-2-nitro-1-propanol, 200 parts of toluene and five parts of p-toluene sulfonic acid is refluxed for approximately three hours as above. To promote more complete esterification of the maleic anhydride, 118 parts more of the nitroalcohol and 2 parts of concentrated sulfuric acid are added to the reaction mixture and refluxing is continued until no further water is liberated. A part of the toluene is then removed by distillation and the remaining product is poured into water and neutralized with sodium carbonate. The crystalline di-2-methyl-2-nitropropyl maleate which precipitates is filtered off, washed with warm water and later combined with that obtained on evaporation of the toluene layer in the filtrate. A total of 260.7 parts of the crude ester is obtained. After recrystallizing from ethyl alcohol, the ester is obtained as a glistening, colorless, crystalline material melting at 78.5–79° C. Analyses give the following results:

|  | Found | Theory |
| --- | --- | --- |
| Carbon | 45.37 | 45.28 |
| Hydrogen | 5.94 | 5.66 |

The ester is soluble in benzene, toluene, dioxan or acetone but insoluble in water or petroleum ether.

EXAMPLE IV

This example illustrates the interpolymerization of di-2-nitrobutyl fumarate with 2-chlorobutadiene-1,3 (chloroprene).

Twenty parts of di-2-nitrobutyl fumarate and 0.75 parts of sulfur are dissolved in 80 parts of chloroprene and the mixture is emulsified by rapid stirring with an aqueous solution of 223 parts of water, 1.0 part of the sodium salt of a sulfonated naphthalene-formaldehyde condensation product and 6.1 parts of a 65% solution of the sodium salt of sulfated oleyl acetate. The temperature of the emulsion is maintained at 40° C. for approximately 1½ hours. To all but 25 parts of the resulting rubber-like latex is added 2 parts of a 50% aqueous dispersion of a 55:45 mixture of phenyl-alpha-naphthylamine and diphenylamine, respectively, and also 8 parts of a 25% aqueous dispersion of tetrabutylthiuram disulfide. On coagulation of both the stabilized and unstabilized (25 parts) portions of the latex with saturated sodium chloride solution and ethyl alcohol, a soft, plastic and coherent rubber-like interpolymer is obtained. The main product is washed with warm and cold water on a small corrugated rubber mill until essentially free of soap and then dried by milling on a warm smooth rubber mill at approximately 50° C. During the latter operation 1% (based on the weight of the practically dry interpolymer of. phenyl-beta-naphthylamine and 1% of tetramethylthiuram disulfide is incorporated with the interpolymer. The 25 part portion of latex is treated similarly but without the addition of stabilizers or antioxidants. Analysis of the latter product for nitrogen shows that approximately 17% by weight of the interpolymer consists of di-2-nitrobutyl fumarate. A total yield of 96.6 parts of rubber-like material is obtained. The interpolymer is then compounded in the usual manner on a small rubber mill as follows:

| | Parts by weight |
| --- | --- |
| Polymer | 10 |
| Magnesium oxide | 0.4 |
| Zinc oxide | 0.5 |
| Carbon black | 3.6 |

Upon curing the above compounded stock for 30 minutes at 109° C. an elastic, rubber-like vulcanizate is obtained which possesses a tensile strength of 2555 lbs. per sq. in. at 550% elongation. This vulcanizate exhibits only 27.5% increase in volume after immersion in kerosene for 48 hrs. at 100° C., whereas a comparable vulcanizate of polychloroprene rubber exhibits approximately 65% increase in volume under the same conditions. A gum stock (polymer 10 parts, magnesium oxide 0.7 part, zinc oxide 0.5 part) of this interpolymer likewise exhibits good rubber-like properties and satisfactory stress-strain properties after vulcanizing for 30 minutes at 109° C. When the above compounded stocks are cured at higher temperatures or for longer periods of time, harder and much stiffer vulcanizates may be obtained. Thus, on curing the black stock for 30 minutes at 140° C., a tough, hard, stiff vulcanizate which exhibits a tensile strength of 2175 lbs./sq. in. at 120% elongation is obtained. Ebonite-like vulcanizates are obtained on curing at still higher temperatures and for longer periods of time.

Starting with a 90:10 ratio of chloroprene:di-2-nitrobutyl fumarate, respectively, and using the same technique as outlined above, a 90% yield of interpolymer containing approximately 6.6% of the ester is obtained after 1½ hours at 40° C. A black stock compounded as above gives after curing for 20 minutes at 140° C. a vulcanizate possessing excellent rubber-like properties and a tensile strength of approximately 3620 lbs./sq. in. at 555% elongation. When immersed in kerosene for 48 hrs./100° C., this vulcanizate exhibits only 44% increase in volume as compared with 65% increase for polychloroprene rubber.

EXAMPLE V

This example illustrates the preparation of an interpolymer of butadiene-1,3 with di-2-methyl-2-nitropropyl maleate. Seven and one-half parts of di-2-methyl-2-nitropropyl maleate and 17.5 parts of butadiene-1,3 are emulsified by shaking in a sealed glass reaction tube with an aqueous phase comprising 22.5 parts of distilled water, 0.25 part of ammonium persulfate, 0.15 part of acetic acid, 2.5 parts of carbon tetrachloride, 8 parts of a 25% solution of N-hydroxypropyl-C-cetylbetaine and 0.85 part of a 30% solution of the sodium salt of a sulfonated naphthalene-formaldehyde condensation product. The tube is rotated constantly end over end for 10 hours in a constant temperature bath maintained at 60° C. To the latex so formed is added 2.5 parts of a 25% dispersion of a 55:45 mixture of phenyl-alpha-naphthylamine and diphenylamine and the interpolymer is then coagulated with ethyl alcohol and brine. After washing with water until free of soap, and after milling to dryness on a rubber mill, 12.8 parts of a soft, plastic, rubber-like material is obtained. Analysis of a small portion shows that 16.8% by weight of the interpolymer is di-2-methyl-2-nitropropyl maleate. The raw stock is compounded with carbon black, softeners and dispersing agents, sulfur, stearic acid, zinc oxide and accelerator in the usual manner and after curing for 30 minutes at 140° C., a pliable, elastic, rubber-like vulcanizate possessing a tensile strength of 2540 lbs./sq. in at 600% elongation is obtained.

EXAMPLE VI

This example illustrates the preparation of an interpolymer of di-2-methyl-2-nitropropyl fumarate with butadiene-1,3. Seven and one-half parts of di-2-methyl-2-nitropropyl fumarate and 17.5 parts of butadiene are copolymerized in emulsion as in Example V. After stabilizing and then coagulating the resultant latex and finally after washing the interpolymer and milling to dryness, 22.8 parts of soft, plastic, coherent, rubber-like material is obtained. The interpolymer contains 19.3% by weight of di-2-methyl-2-nitropropyl fumarate according to its nitrogen analysis. The raw stock is compounded with carbon black, softeners and dispersing agents, sulfur, stearic acid, zinc oxide and accelerator in the usual manner and after curing for 15 minutes at 140° C., a pliable, elastic, rubber-like vulcanizate which possesses a tensile strength of 2235 lbs./sq. in. at 425% elongation is obtained. After immersion in kerosene at 100° C. for 48 hours the vulcanizate exhibits 107.7% increase in volume. A butadiene polymer similarly prepared but without the nitro ester has a 400% volume increase or may even disintegrate when immersed in kerosene.

EXAMPLE VII

This example illustrates the preparation of a bulk interpolymer of methyl methacrylate with di-2-nitrobutyl fumarate. A mixture of 11.5 parts of methyl methacrylate, 3.5 parts of di-2-nitrobutyl fumarate and 0.15 part of benzoyl peroxide is heated for approximately 12 hours at 55° C. The mixture sets up during this time to a somewhat soft but clear, homogeneous solid. Further polymerization is promoted by heating for 4 days at 55° C. and finally for one day at 100° C. The final product, a transparent, practically colorless, hard, tough glass-like interpolymer, is soluble in benzene, ethyl acetate, dioxane and acetone. It softens at 57° C. and may be readily molded into various shapes.

Similarly, a homogeneous, clear, hard, tough, solid product is obtained on polymerization of a mixture comprising 66.6% by weight of methyl methacrylate with 33.4% of di-2-methyl-2-nitropropyl maleate. By polymerizing mixtures of styrene, acrylonitrile or other polymerizable vinyl- and vinylidene-type materials with nitroalkyl esters of maleic, fumaric or related acids, polymers may be prepared readily either in bulk as above, in the presence of inert organic solvents, or in emulsion.

The invention is generic to the esters of any aliphatic monohydric nitroalcohol, preferably of a nitroalcohol wherein the nitro group is on a carbon adjacent to the carbon bearing the hydroxyl group, with any alpha-ethylenic alpha, beta-dicarboxylic acid, i. e., with any acid having but two carboxyl groups and those on two adjacent carbon atoms, of which at least one is directly attached to an ethylenic double bond. Suitable acids include maleic acid, mono- and di-substituted maleic acids such as methylmaleic (citraconic), ethylmaleic, and phenylmaleic acids; halogen maleic acids such as chloromaleic, iodomaleic and bromomaleic acids; fumaric acid and substitution products thereof such as chlorofumaric, bromofumaric, iodofumaric, methylfumaric (mesaconic), ethylfumaric, propylfumaric and phenylfumaric acids and the like. Suitable alcohols include 3-nitro-2-butanol, 2-nitro-3-hexanol, 2-nitro-1-butanol, 3-nitro-2-pentanol, 3-nitro-4-heptanol, 2-nitro-1-pentanol, 3-nitro-2-hexanol, 5-nitro-4-octanol, 1-nitro-2-butanol, 1-nitro-2-pentanol, 2-nitro-3-pentanol, 2-methyl-2-nitro-1-propanol, 2-methyl-2-nitro-1-butanol, 2-methyl-2-nitro-3-hexanol, 3-methyl-3-nitro-4-heptanol, 3-methyl-3-nitro-2-pentanol, 3-methyl-2-nitro-4-heptanol, 3-methyl-2-nitro-1-butanol, 4-methyl-3-nitro-2-pentanol, 2-methyl-3-nitro-4-heptanol, 3-methyl-1-nitro-2-butanol, 4-methyl-2-nitro-3-pentanol, 2-methyl-4-nitro-3-hexanol, 2-nitro-2,4-dimethyl-3-pentanol, 4-nitro-2-methyl-3-heptanol, 4-nitro-2,4-dimethyl-3-hexanol, 4-nitro-2,5-dimethyl-3-hexanol, 3-nitro-1-propanol, 2-nitro-1-ethanol, 2-chloro-2-nitro-1-propanol, 2-chloro-3-nitro-1-butanol.

Nitroalcohols of the general formula

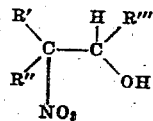

wherein R', R", and R''' are hydrogen or monovalent aliphatic, including cycloaliphatic, and preferably alkyl radicals, are particularly useful since they can be readily prepared by condensation of aldehydes with nitroparaffins as disclosed in U. S. Patents 2,132,330, 2,132,352, 2,139,120, and 2,139,121.

The esters of this invention may be prepared conveniently and in good yields by direct action of the alcohol with the acid or with its anhydride as illustrated in the foregoing examples. However, other methods of esterification, such as reaction of the nitroalcohols with derivatives of the acids including the acid halides and nitriles may be employed. The esters may be prepared also by ester interchange of the nitroalcohols with lower simple alkyl, e. g., methyl or ethyl, esters of the alpha-unsaturated alpha,beta-dicarboxylic acids.

A wide variety of new and valuable polymeric compositions may be prepared by polymerization of the nitroalkyl esters described herein, and especially by polymerizing together mixtures of the esters of this invention with other polymerizable materials. Valuable products may be obtained by the polymerization of the esters of this invention with a compound having the formula

wherein A is hydrogen, halogen or hydrocarbon and B is halogen or an organic radical containing a carbon atom joined to another atom by a plural bond, the carbon atom being removed from the

radical by not more than one atom. Such compounds include the polymerizable vinyl and vinylidene compounds, for example, vinyl halides such as vinyl chloride or vinyl bromide, vinyl esters such as vinyl acetate, vinyl formate, vinyl benzoate, and the like, vinylidene halides such as vinylidene chloride and vinylidene bromide, acrylic or methacrylic acids and their derivatives such as the methyl, ethyl, propyl, butyl, hexyl and octyl esters, their anhydrides, amides and N-substituted amides, alpha-chloroacrylic acid and its corresponding esters, nitrile, amide or N-substituted amides, styrene, vinyl ketones such as methyl vinyl ketone, methyl isopropenyl ketone, and the like. Particularly valuable in view of their excellent rubber-like properties are the interpolymers obtained with a special type of vinyl or vinylidene compound, i. e., conjugated dienes including butadiene-1,3, 2,3-dimethyl butadiene-1,3, 2-chlorobutadiene-1,3, 2-bromobutadiene-1,3, 1-methyl butadiene-1,3 and 2-methyl butadiene-1,3. Of these dienes, butadiene-1,3, 2-methyl butadiene-1,3, and particularly 2-chlorobutadiene-1,3 are preferred. Other modifications of the present invention include polymerization of the nitroalkyl esters with two or more different polymerizable unsaturated materials in the presence or absence of inert materials, and polymerization in the presence of film-forming materials, paint or varnish adjuncts as, for example, natural or synthetic resins, cellulose derivatives, drying oils, etc.

The polymerization of the nitroalkyl esters, alone or with other polymerizable materials, may be carried out by any of the methods commonly employed in the art such as by heating or by the application of ultraviolet light. The polymers may be prepared in bulk, in solution with inert solvents, or in emulsion, preferably in the presence of polymerization catalysts such as organic or inorganic persulfates, peroxides, and perborates, as, for example, hydrogen peroxide, ammonium persulfate, sodium or potassium persulfate, benzoyl peroxide, acetyl peroxide, acetyl benzoyl peroxide, sodium perborate, and the like. In general, however, it is preferable to employ emulsion polymerization technique as illustrated in the examples. Any substance which is capable of forming a stable dispersion of the polymerizable materials in water may be employed. Examples of such agents are sodium oleate, sodium rosinate, the sodium salt of sulfated oleyl acetate, sodium cetylsulfate, sodium isopropyl naphthalene sulfonate, N-stearylbetaine, N-hydroxy-propyl-C-cetylbetaine, organic or inorganic salts of long chain amines such as octyl-, dodecyl-, 9,10-octadecenyl-, octadecyl- and cetyl amines, and cetyl p-dimethylaminobenzoate. The polymerization may also be conducted in such a manner as to give a granular product. Dispersing agents which may be employed for the preparation of granular products are, among others, a polymeric product prepared from 75% of methacrylic acid and 25% of methyl methacrylate which has been neutralized with sodium hydroxide to a pH of 7-8, sodium celluloseglycolate, sodium starchglycolate, methylstarch, soluble starch, partially hydrolyzed polyvinyl acetate, various gums such as gum tragacanth, sodium alginate and the like. For polymerization in emulsion, usually 2 to 3% solutions of the emulsifying agents in water are employed but, depending on the properties of the emulsifying agent and the particular monomer employed, stronger or weaker solutions, for example, 0.02% to 10% may be used. In the granulation process, 0.1 to 1.0% solutions of the granulating agent in water are usually suitable although in this case also the most satisfactory concentration of such agents will be dependent on their dispersing properties in relation to the polymerizable monomers. Usually a polymerization catalyst of the type mentioned above is desirable to promote more rapid granular or emulsion polymerizations, although such catalysts are not always necessary as illustrated in the foregoing examples.

The polymerization, particularly by the granular or emulsion technique, may be conducted under either neutral, slightly acid or basic conditions. In many instances the polymerization may be carried out most satisfactorily in open or closed vessels at essentially atmospheric pressure. However, when interpolymers with highly volatile materials such as butadiene are prepared at temperatures above the boiling points of the monomers, it is necessary to employ sealed reaction vessels, and accordingly, the polymerization is carried out at superatmospheric pressures. With higher boiling polymerizable monomers, atmospheric, superatmospheric, or subatmospheric pressures may be employed as desired. When emulsion or granulation polymerization techniques are employed, it is desirable, particularly in the case of granulation, to agitate the mixtures by shaking or rapid stirring. In general, temperatures of 5° C.–100° C. are preferred to effect the polymerization. However, the most satisfactory temperatures are dependent to some extent on the particular monomers employed as well as upon other operating conditions and the desired results.

It is especially desirable to conduct the polymerization of nitroalkyl esters of alpha-unsaturated alpha,beta-dicarboxylic acids with butadienes in emulsion to avoid the formation of low molecular weight addition products of the ester and the butadiene. Any of the above-mentioned emulsifying agents may be employed and a monomer concentration of 10–50% in the aqueous phase is satisfactory. For the formation of synthetic rubber-like materials, the polymerization is preferably carried out at temperatures within the limits 30–60° C., and still more preferably between 30–40° C. The properties of the rubber-like interpolymers depend to a considerable extent upon the particular diene and ester employed as well as on the monomer ratio of diene to ester. In general, interpolymers which exhibit the most satisfactory rubber-like properties are obtained when no more than 50%, and preferably less than 50%, e. g., 5 to 45%, by weight of the total polymerizable monomers is ester. Rubber-like interpolymers of chloroprene with 10–30% of the nitroesters exhibit outstanding oil resistance compared with polychloroprene rubber itself or corresponding copolymers of chloroprene with simple alkyl (i. e., methyl, ethyl, propyl, etc.), esters of alpha-unsaturated alpha,beta-dicarboxylic acids. Interpolymers of chloroprene with 10% or less of the nitroalkyl esters also exhibit a significant improvement in oil resistance but to a lesser degree. With butadiene-1,3 or isoprene, 10–50% of the nitroesters likewise give excellent rubber-like interpolymers which exhibit less swelling in oils than corresponding interpolymers obtained with simple alpha-unsaturated alpha,beta-dicarboxylic acid esters. Modifying agents such as sulfur, hydrogen sulfide, (U. S. Patent 2,163,250), sulfur dioxide and the organic modifying agents of U. S. Patents 2,227,517–8–9 may be used in modifying the interpolymerization with chloroprene and the butadiene interpolymerizations may be advantageously modified by the use of sulfur, compounds having a plurality of chlorine atoms on the same carbon atom and by certain mercaptans.

Agents which specifically accelerate the polymerization may be employed also, although in many cases, particularly with chloroprene, such catalytic agents are not necessary. When the polymerization has proceeded as far as is desired, substances having an antioxidant and/or stabilizing action, such as phenyl-alpha-naphthylamine, phenyl-beta-naphthylamine or tetra-alkylthiuramdisulfides may be added. These substances tend to stop further polymerization in emulsion and prevent oxidation or degradation of the polymers during subsequent treatment. Coagulation of the polymers from the emulsions may be effected by any of the commonly employed methods such as by the addition of saturated solutions of sodium chloride, magnesium sulfate, or aluminum sulfate, by the addition of acids, bases, or alcohols or by freezing. Drying, milling, compounding and curing of the polymers can also be carried out by the usual methods employed for natural rubber or other synthetic rubbers. Plasticizing agents such as chlorinated naphthalene, chlorinated paraffin wax or any of the usual rubber or synthetic rubber plasticizers may be incorporated with the polymers prior to or during compounding. Vulcanizates which vary from soft, pliable, elastic, rubber-like materials to hard, tough, ebonite-like compositions may be obtained by modifying the compounding formulae and/or the temperature and period of cure.

The nitroalkyl esters of alpha-unsaturated alpha,beta-dicarboxylic acids are, therefore, useful for the preparation of a wide variety of valuable polymeric materials. The resinous products obtained with other polymerizable vinyl or vinylidene type compounds such as methacrylic esters, styrene, vinyl chloride and the like are particularly useful as glass substitutes. The polymers may be formed in bulk in containers to give castings of any desired shape. Shaping of the polymeric products may be accomplished readily by molding, sawing, drilling, filing, turning, etc. They may be formed into foils or films, particularly the tougher, more plastic, and pliable copolymers, by casting from solution or by hot pressing. Solutions of these resinous materials may be employed for coating and impregnating compositions and as textile sizes. The rubber-like products obtained with butadienes are valuable as substitutes for natural rubber and are highly preferred to natural rubber in the many applications which require a high degree of oil or solvent resistance.

The above description and examples are intended to be illustrative only. Any modifications of or variation therefrom which conforms to the spirit of the invention is intended to be included within the scope of the claims.

What is claimed is:

1. An interpolymer of 2-chlorobutadiene-1,3 with di-2-nitrobutyl fumarate.
2. An interpolymer of 1,3-butadiene with di-2-methyl-2-nitropropyl maleate.
3. An interpolymer of 1,3-butadiene with di-2-methyl-2-nitropropyl fumarate.
4. A polymer obtained by the polymerization of a polymerizable conjugated butadiene with a mononitro alkanol diester of an alpha ethylenically-unsaturated, alpha,beta-dicarboxylic acid.
5. A copolymer of 2-chlorobutadiene-1,3 with a mononitro alkanol diester of an alpha ethylenically - unsaturated, alpha,beta - dicarboxylic acid.
6. A copolymer of butadiene-1,3 with a mononitro alkanol diester of an alpha ethylenically-unsaturated, alpha,beta-dicarboxyl acid.

CHARLES JOSEPH MIGHTON.

Certificate of Correction

Patent No. 2,365,717.                                                December 26, 1944.

CHARLES JOSEPH MIGHTON

It is hereby certified that errors appear in the printed specification of the above-numbered patent requiring correction as follows: Page 2, second column, line 41, after the word "interpolymer" insert a closing parenthesis; page 4, first column, lines 28 to 31 inclusive, for that portion of the formula reading

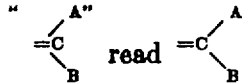

and that the said Letters Patent should be read with these corrections therein that the same may conform to the record of the case in the Patent Office.

Signed and sealed this 10th day of April, A. D. 1945.

[SEAL]

LESLIE FRAZER,
*Acting Commissioner of Patents.*